April 24, 1934.     M. FLINKER     1,956,418
MOTION PICTURE PROJECTOR
Filed Feb. 11, 1932

Inventor:
Max Flinker,
by Charles N. Tullar
His Attorney.

Patented Apr. 24, 1934

1,956,418

UNITED STATES PATENT OFFICE 1,956,418

MOTION PICTURE PROJECTOR

Max Flinker, Berlin-Pankow, Germany, assignor to General Electric Company, a corporation of New York Application February 11, 1932, Serial No. 592,385
In Germany February 21, 1931

3 Claims. (Cl. 88—17)

My invention relates to motion picture projectors and it has for its object the provision of improved means by which the framing of the picture is facilitated before the machine is started. The construction which I have devised is particularly well adapted for use in the case of projectors in which it is inconvenient to mount auxiliary apparatus such as a pilot lamp close behind the projection window, for example, projectors having the projection shutter arranged behind the window in addition to the fire shutter. In accordance with my invention I provide the film gate with a second or observation window displaced from the projection window a distance equal to a multiple of the height of a film picture, the film being adjusted longitudinally in the gate for proper framing while it is observed through the observation window. I also provide behind this window a light source such as a pilot lamp which being displaced from the projection window does not interfere with the projection shutter or with the fire shutter.

My invention will be better understood from the following description taken in connection with the accompanying drawing, and its scope will be pointed out in the appended claims.

Figure 1:
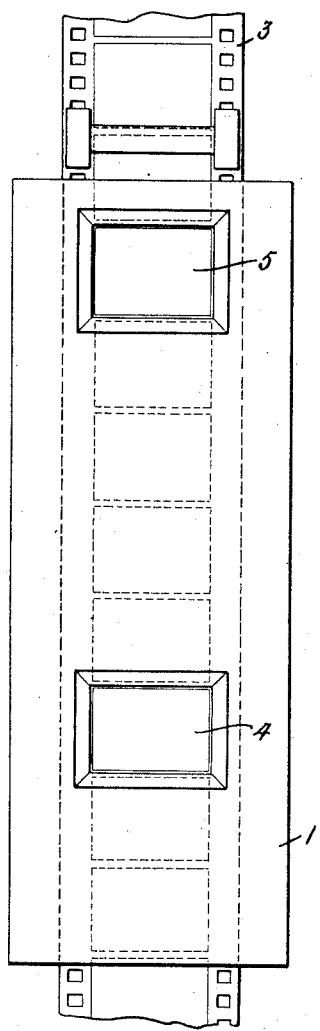
Figure 2:
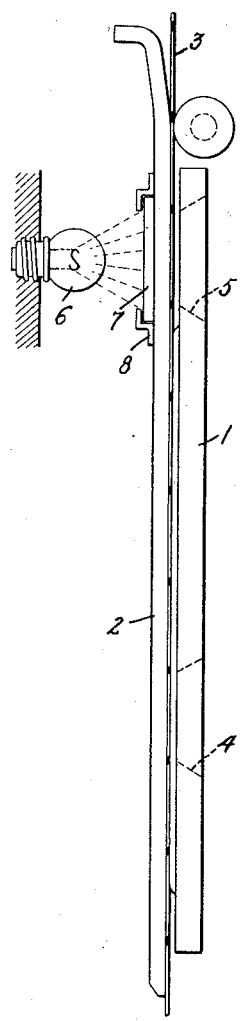

Referring to the drawing, Fig. 1 is a front view of a film gate embodying my invention and Fig. 2 is a side view thereof. In the drawing the film gate is represented as comprising the guide plate 1 and the guide 2 which may comprise two parallel members adapted to engage a film 3 at the marginal portions thereof. The guide plate 1 is provided with the usual projection window 4 whose dimensions are substantially the same as the dimensions of the pictures on the film. Plate 1 is also provided with a second window 5 which in the present case is located above the projection window 4 from which it is spaced a distance equal to a multiple of the height of the pictures on the film. Thus in the present case the second or observation window 5 is displaced from the projection window a distance equal to five times the height of the film pictures. For illuminating the film in order that the picture behind the window 5 may be seen by the operator, I have provided the lamp 6 which may be a small electric lamp located preferably opposite the center of the window, and to provide a more uniform illumination of the film at the window I have provided a light diffusing screen 7 which, for example, may be a piece of ground glass supported by the brackets 8.

When a new film is threaded through the projector and before the machine is started, the operator observes the film through the window 5 while making the necessary framing adjustment, for since the observation window is spaced from the projection window a distance equal to a multiple of the height of the pictures, if the picture as seen in the window 5 is properly framed, the picture in the projection window will also be properly framed. This framing adjustment having been made before operation of the projector is started, no further framing adjustment is required.

What I claim as new and desire to secure by Letters Patent of the United States is:

1. In a motion picture projector, a film gate having a window through which pictures on the film are projected, and a film observation window, said windows being displaced from each other a distance equal to a multiple of the height of the film pictures, means supported by the projector and arranged behind the observation window for illuminating the film therein and a diffusing screen between the illuminating means and said observation window.

2. In a motion picture projector having means for projecting pictures from a film, a film gate having a window through which said means is arranged to project the pictures and a film observation window, said windows being of substantially the same size and being displaced from each other a distance equal to a multiple of the height of the film pictures, a lamp supported by the projector and arranged behind the observation window, and a diffusing screen arranged adjacent to the observation window and between it and said lamp.

3. In a motion picture projector, a film gate including rear guide and a front plate having therein a projection window and a film observation window, said windows having substantially the same dimensions and being displaced from each other a distance equal to a multiple of the height of a film picture, a pilot lamp arranged behind said observation window and a light-diffusing screen supported by said rear guide between the lamp and the window.

MAX FLINKER.